United States Patent [19]

Ikimi et al.

[11] Patent Number: 4,924,637
[45] Date of Patent: May 15, 1990

[54] METHOD OF MACHINING CERAMIC ROTOR FOR PRESSURE WAVE TYPE SUPERCHARGER

[75] Inventors: Takahiro Ikimi, Komaki; Tsuneharu Taketomi; Kiminari Kato, both of Nagoya, all of Japan

[73] Assignee: NGK Insulators, Ltd., Japan

[21] Appl. No.: 258,706

[22] Filed: Oct. 17, 1988

[30] Foreign Application Priority Data

Oct. 21, 1987 [JP] Japan .................... 62-265982

[51] Int. Cl.$^5$ ............................... B24B 1/00
[52] U.S. Cl. ......................... 51/290; 51/327; 51/283 R; 51/277; 51/217 T
[58] Field of Search ............ 51/290, 291 R, 327, 51/227 R, 237, 277, 217 T, 283 R, 326, 324; 279/4, 1 L, 1 ME, 1 J

[56] References Cited

U.S. PATENT DOCUMENTS

| | | | |
|---|---|---|---|
| 2,266,034 | 12/1941 | Heald | 51/290 |
| 2,720,735 | 10/1955 | Ruehl et al. | 51/227 R |
| 3,133,740 | 5/1964 | Drantz | 51/237 R |
| 4,567,695 | 2/1986 | Schaeffler | 51/291 |

Primary Examiner—Robert Rose
Attorney, Agent, or Firm—Arnold, White & Durkee

[57] ABSTRACT

A method of machining a ceramic rotor for a pressure wave type supercharger which includes the steps of pressing one end surface of the ceramic rotor against an inner bottom surface of a hydraulic chuck, hydraulically grasping the ceramic rotor with its outer circumference by means of clamping device, and then machining the other end surface and an inner diameter portion of the rotor. Before holding the ceramic rotor in the hydraulic chuck, a metal cylinder is fitted coaxially on the ceramic rotor so that end surfaces and inner circumference of the rotor can be machined with high dimensional accuracy.

5 Claims, 7 Drawing Sheets

FIG_1
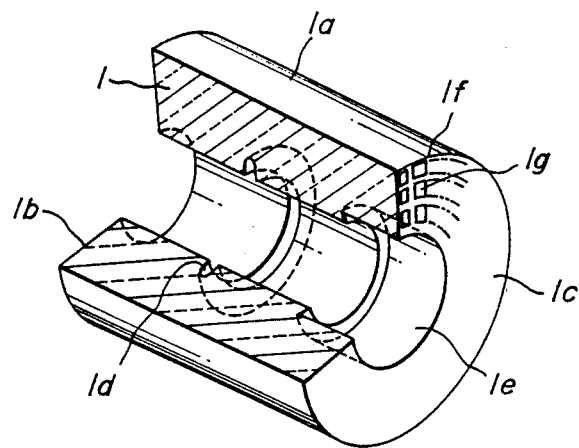
FIG_2
PRIOR ART
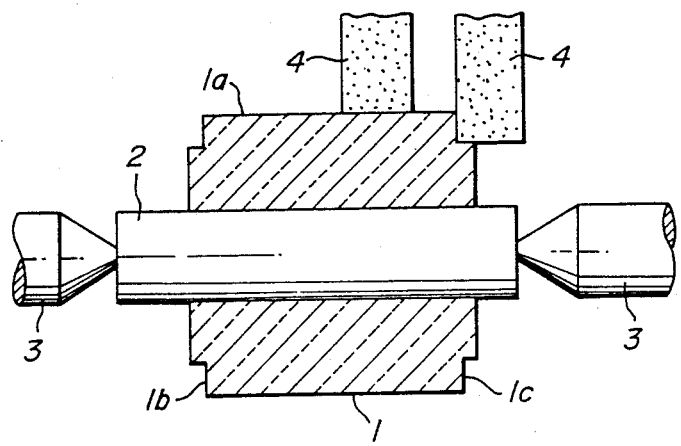

FIG_4a
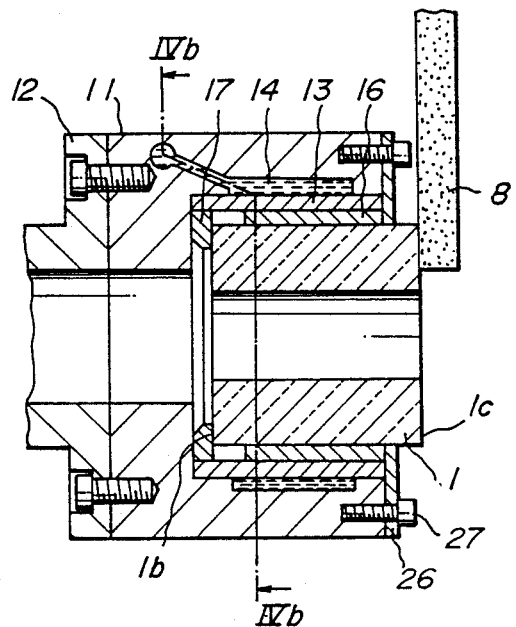
FIG_4b
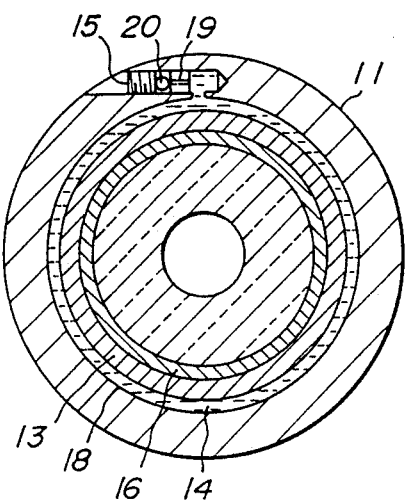

FIG_5a
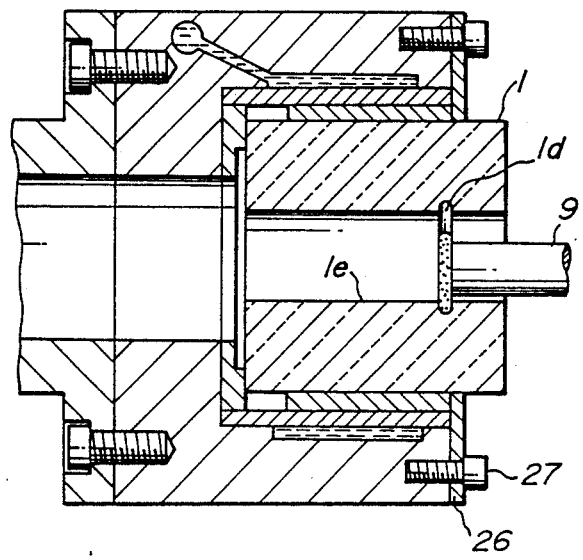
FIG_5b
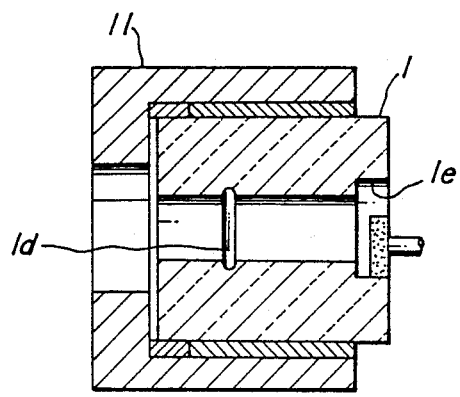

FIG_6
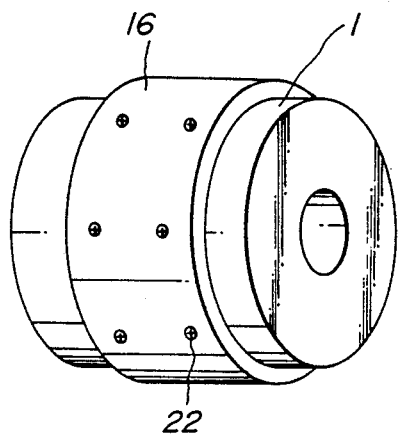
FIG_7a
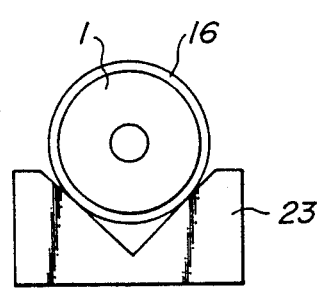
FIG_7b
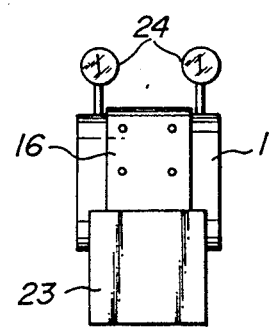

FIG_8a
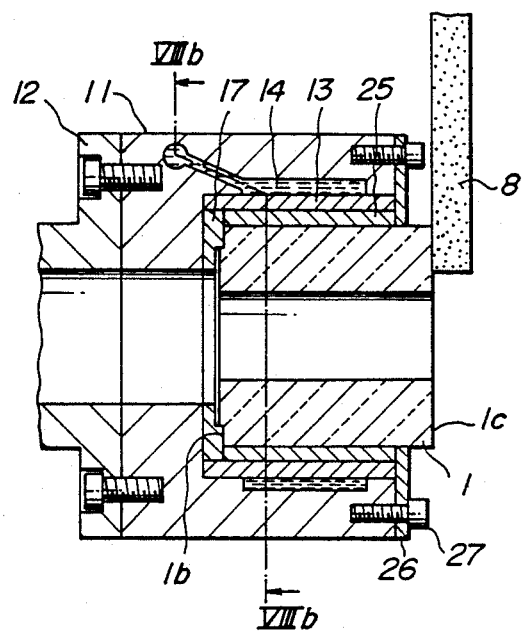
FIG_8b
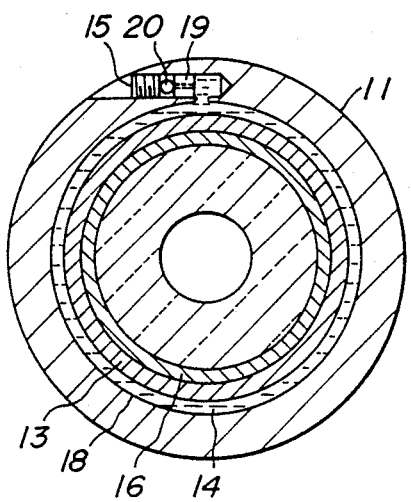

METHOD OF MACHINING CERAMIC ROTOR FOR PRESSURE WAVE TYPE SUPERCHARGER

BACKGROUND OF THE INVENTION

Field of the Invention and Related Art Statement:

This invention relates to a method of machining ceramic rotors for pressure wave type superchargers, and more particularly to a method of machining ends, surfaces, and inner diameters of rotors for pressure wave type superchargers so as to obtain predetermined sizes and dynamic balance of the rotors; with high accuracy.

The ceramic rotors for pressure wave type superchargers have been developed for improving outputs or fuel consumption rates of internal combustion engines, for example, diesel engines.

Referring to FIG. 1, the ceramic rotor 1 for the pressure wave type supercharger (referred to simply as "rotor" hereinafter) has an inner circumferential surface 1e fitted with a rotary shaft (not shown) for rotating the rotor, a slit 1d formed in the inner circumferential surface 1e for fixing the rotary shaft thereto, an outer circumferential surface 1a, end surfaces 1b and 1c, cells 1g for supercharging or supplying the air whose pressure is raised by transmitting high pressure of exhaust gases to the air and an outer wall 1f.

Such a rotor is formed by extruding a ceramic material superior in strength at high temperatures such as silicon nitride by the use of an extruding dies having predetermined through-holes corresponding to the cells shown in FIG. 1 to obtain an extruded honeycomb-shaped formed body. After the honeycomb formed body has been fired, it is machined by means of a grinding wheel or the like to predetermined dimensions and to obtain a predetermined dynamic balance. This machining is required to have high accuracy with respect to perpendicularity of the end surfaces relative to the inner diameter and concentricity of the inner and outer diameters. Therefore, in holding the rotor for the machining, it has been required to limit a deviation from a proper relation between the end surfaces and outer diameter to the minimum value.

In the machining method of the prior art, the machining of the rotor is effected first on the outer diameter of the outer circumference and parts of the both end surfaces, then the one end surface and the slit, and finally the other end surface and the inner diameter of the inner circumference of the rotor.

In more detail, the machining method of the prior art is carried out in the following manner. In order to machine the outer diameter and the parts of both the end surfaces, as shown in FIG. 2, the rotor 1 is first fixed to a center jig 2 having centers 3, and the outer diameter 1a of the outer circumference of the rotor is ground by a grinding wheel 4 driven by a cylindrical grinder (not shown). Thereafter, parts 1b and 1c of both the end surfaces are ground. In other words, the machining is effected such that a center axis of the outer diameter 1a is brought into alignment with axes of the centers 3 and the parts 1b and 1c form surfaces perpendicular to the axes of the centers 3.

In cutting the end surfaces and slit of the rotor, if it is directly chucked by a scroll chuck generally used in machine tools, the outer wall of the rotor is liable to be broken because a thickness of the outer wall is of the order of 2 mm. In order to avoid such a problem, a chucking method shown in FIG. 3 has been proposed. In this method, after one end of a rotor 1 is adhered into a cylindrical metal die 5 by wax, the die 5 is mounted on a machining apparatus by means of a scroll chuck 6 so that deviations of an outer diameter and an end surface are minimized, which are measured by dial gauges 7. A remaining end surface of the end surface 1b partially machined in the previous step is ground by a grinding wheel 8 and a slit 1d is formed in the rotor 1 by means of a slit grinding wheel 9. The other end surface 1c and an inner diameter 1e of an inner circumferential surface are ground by a cylindrical grinder after the rotor has been chucked in the same manner as described above.

With the above machining method, it is required to adhere the rotor to the metal die for machining one end surface and a slit and the other end surface and an inner diameter. Moreover, centering the rotor is needed, which is a troublesome and time-consuming operation and requires a skillful operator. Further, in order to fulfill the severe requirement in perpendicularity of both end surfaces relative to the inner diameter, machining the one end surface and the slit and the other end surface and the inner diameter must be carried out at some time. Moreover, the length of the metal die directly chucked by the scroll chuck is short and the rotor is supported so as to overhang in a long distance so that a distance between the chucked portion and ground portion of the rotor is long. Therefore, the rotor is apt to move from the chucked position by grinding pressure during grinding so that it is difficult to machine the rotor with high accuracy. Owing to such a difficulty, heavy grinding is impossible and the grinding speed cannot be increased.

Moreover, the machining of outer circumference of the rotor often causes machining scratches or scores. Further, in the event that local deformation of the rotor occurs in a firing step, an outer wall-thickness may become uneven by machining the outer circumference of the rotor so that its mechanical strength decreases.

Moreover, the unevenness in thickness of the outer circumferential wall produced by machining thereat detrimentally affects the dynamic balance of the rotor.

SUMMARY OF THE INVENTION

In order to overcome the problems of the prior art described above, the inventors have investigated a method to find a hydraulic jig for holding a product (jig utilizing a hydraulic chuck). The invention resides in the discovery that by using a hydraulic chuck, a ceramic rotor for a pressure wave type supercharger can be rigidly and simply chucked with high accuracy by holding an entire outer circumference of the rotor without using a die required in the prior art so that end surfaces and inner diameter of the rotor can be quickly machined with high accuracy.

It is a principal object of the invention to provide a method of machining a ceramic rotor for a pressure wave type supercharger, which eliminates all the disadvantages of the prior art and which utilizes a hydraulic chuck capable of simply and firmly chucking the ceramic rotor so that the ceramic rotor can be quickly machined with high accuracy In order to achieve this object, a method of machining a ceramic rotor for a pressure wave type supercharger according to the invention comprises steps the of pressing one end surface of the ceramic rotor against an inner bottom surface of a hydraulic chuck, hydraulically grasping the ceramic rotor with its outer circumference by means of clamping means, and then machining the other end surface and an inner diameter portion of the ceramic rotor.

In a preferred embodiment, before holding the ceramic rotor in the hydraulic chuck, a metal cylinder is fitted substantially coaxially on the ceramic rotor so that end surfaces and inner circumference of the rotor can be machined with high dimensional accuracy.

The invention will be more fully understood by referring to the following detailed specification and claims taken in connection with the appended drawings.

BRIEF DESCRIPTION OF THE DRAWINGS

FIG. 1 is a partially removed perspective view illustrating a sectional construction of a ceramic rotor for a pressure wave type supercharger;

FIGS. 2 and 3 are explanatory views for explaining methods of the prior art;

FIG. 4a is a sectional view for explaining the method according to the invention;

FIG. 4b is a sectional view taken along the line IVb—IVb in FIG. 4a;

FIGS. 5a and 5b are sectional views for explaining one embodiment of the invention;

FIG. 6 is a perspective view for explaining another embodiment of the invention using a metal cylinder;

FIG. 7a is a side view for explaining the method of fixing the metal cylinder to the ceramic rotor according to the embodiment shown in FIG. 6;

FIG. 7b is a front view of the rotor and metal cylinder shown in FIG. 7a;

FIG. 8a is a sectional view for explaining a further embodiment of the invention;

FIG. 8b is a sectional view taken along the line VIIIb—VIIIb in FIG. 8a; and

FIG. 9 is a sectional view for explaining the method of machining of the embodiment shown in FIG. 8a.

DESCRIPTION OF THE PREFERRED EMBODIMENT

Figure 3:
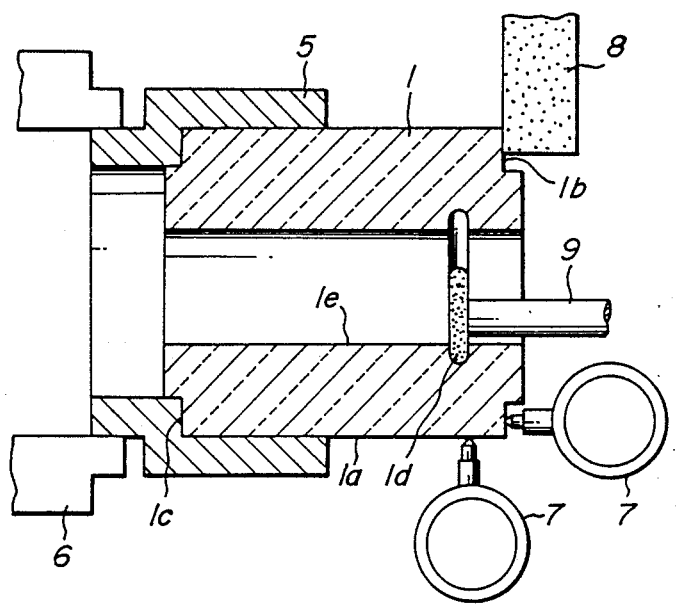

FIG. 4a illustrates a jig (utilizing a hydraulic chuck) for use in the machining method according to the invention. A main body 11 of the hydraulic chuck is clamped by means of set screws to a face plate 12 continuous to a main spindle of a machining apparatus. A pressure chamber 14 to be filled with an operating oil is formed between a holding member 13 and an inner circumferential surface 18 of the main body 11 of the hydraulic chuck. In FIGS. 4a and 4b, a left portion of the pressure chamber 14 viewed in FIG. 4a is sealed by an operating screw 15 through a steel ball 20 and a piston 19 serving also as sealing member. A metal cylinder 16 is interposed between the rotor 1 and the holding member 13. Reference numeral 17 denotes an end surface anchoring portion 17.

A method of chucking a ceramic rotor 1 to be machined on the main body of the hydraulic chuck will be explained. While one end surface 1b of the ceramic rotor 1 fitted in the metal cylinder 16 later explained is being urged against the end surface anchoring portion 17, the operating screw 15 is rotated so that the pressure in the operating oil in the pressure chamber is increased to contract the holding member 13 inwardly. As a result, the metal cylinder 16 is chucked on the cylindrical grinder (not shown). If the clamping of the metal cylinder 16 by the holding member 13 is not sufficient, a plate-shaped stopper 26 is fixed to the main body 11 of the chuck by means of bolts 27 to prevent the metal cylinder 16 from moving.

The present invention can preferably use a hydraulic chuck which is disclosed in Japanese Patent Application Publication No. 38-24,290, Japanese Utility Model Application Publication No. 58-21,605 and the like. Clamping means for raising the pressure in the pressure chamber 14 may be a screw manually operated or a piston and cylinder assembly automatically operated.

The chucked ceramic rotor 1 is ground with its end surface 1c by a grinding wheel as shown in FIG. 4a. After the ceramic rotor 1 has been removed from the main body 11 of the hydraulic chuck, the other end surface 1b is ground in the same sequence as the end surface 1c. However, the other end surface 1b may be ground after machining the inner circumference of the ceramic rotor 1 next explained.

The machining of the inner circumference of the ceramic rotor 1 will be explained by referring to FIGS. 5a and 5b.

The ceramic rotor 1 is chucked onto an internal grinding machine (not shown) in the same manner as in the machining of end surfaces. Then the slit 1d is formed by means of a grinding wheel 9 as shown in FIG. 5a. In machining the inner diameter of the rotor 1, after rough machining, finishing machining may be effected.

In FIG. 5b, after machining the slit 1d, the ceramic rotor 1 is removed from the hydraulic chuck body 11, turned end for end and again chucked and is machined with its inner diameter. However, without turning the rotor end for end, after machining the slit, the inner diameter may be continuously machined, dependently upon a location of inner diameter machining and degree of machining.

When a ceramic rotor is chucked on a machining apparatus, a split collet may be used as explained with reference to FIGS. 8a, 8b and 9. However, it is more preferable to interpose a metal cylinder as shown in FIG. 4.

How to fit a metal cylinder onto the ceramic rotor will be explained by referring to FIGS. 6 and 7.

First, the ceramic rotor 1 is inserted into a metal cylinder 16 having a length shorter than a total length of the rotor and an inner diameter smaller than an outer diameter of the rotor so that both ends of the rotor 1 extend or are exposed from the metal cylinder 16. The metal cylinder 16 is provided with set screws 22 for fixing the metal cylinder 16 to the rotor 1. The metal cylinder 16 is made of a carbon steel, carbon tool steel, alloy tool steel or the like.

The rotor 1 fitted in the metal cylinder 16 is arranged on a jig in the form of a V-block so that an outer circumference of the metal cylinder 16 is in contact with V-shaped surfaces of the jig 23 as shown in FIGS. 7a and 7b. Points of index dial-gauges 24 are brought into contact with the outer circumference of the rotor 1 at both ends and the metal cylinder 16 is rotated. The metal cylinder 16 is fixed to the rotor 1 by means of the set screws 22 so that each value of the index dial-gauges 24 becomes a minimum, respectively. With this operation, center axes of the metal cylinder 17 and the rotor 1 are brought substantially into coaxial alignment with each other.

The ceramic rotor to be fitted with the metal cylinder is applicable to those which are obtained by machining outer circumferences of sintered ceramic bodies to have predetermined outer diameters. In case of ceramic rotors for pressure wave type superchargers, outer circumferential walls having uniform thicknesses and free from faults such as machining scores are important for obtaining good dynamic balance and removing faults because the rotor is required to have a dynamic balance less than 20 g-cm at one end. On the other hand, a mechanical strength is required. For such a requirement, outer circumferential surfaces of ceramic rotors as fired are preferable. If the rotor is as fired, there is no scratches or scores due to machining. Such scores may cause faults in strength.

Even if the outer circumference of the rotor is deformed in the forming process and local strains occur in the firing process, bulk strength of the rotor is improved in comparison with rotors machined with their outer circumferences, because of the uniform thicknesses of the outer circumferential walls formed by extruding. From a spinning test, breaking circumferential speeds of rotors whose outer circumferences are as fired are improved more than 15% in comparison with machined rotors. Moreover, although the outer diameter of the ceramic rotor as fired is generally inferior in dimensional accuracy, by using the metal cylinder the end surfaces and inner circumference can be machined with high accuracy because that substantial central axes of the metal cylinder and the ceramic rotor are easily brought into alignment with each other with high accuracy. The "substantial central axis" in this case means an imaginative axis determined when deviations are minimum read from index dial gauges whose points abut against outer circumferential surfaces of both ends of a ceramic rotor.

Another embodiment of the invention will be explained by referring to FIGS. 8a and 8b. This embodiment is different from the embodiment shown in FIGS. 4a and 4b, in that an end surface 1b of a ceramic rotor 1 is previously machined to form a step and fitted with an end surface anchoring portion 17 and a split collet 25 is interposed between the ceramic rotor 1 and a holding member 13 of a main body 11 of a hydraulic chuck.

In chucking the ceramic rotor in the main body 11 of the hydraulic chuck, first the ceramic rotor 1 is inserted in the split collet 25. While one partially machined end surface 1b of the rotor 1 is forced against the end surface anchoring portion 17, an operating screw 15 is screwed toward a pressure chamber 14 so as to raise the pressure of the operating oil therein to contract the holding member 13 inwardly. This contraction of the holding member 13 causes the split collet 25 to deform inwardly so that the rotor 1 is chucked with its entire outer circumference. The split collet 25 is prevented from moving by a plate-shaped stopper 26 fixed to the main body 11 of the chuck by means of bolts 27.

The split collet 25 serves to supplement a portion corresponding to difference between the outer diameter of the rotor and the inner diameter of the rotor receiving portion in the main body of the hydraulic chuck. A ceramic rotor having a different outer diameter can be chucked only by exchanging the split collet with new split collet whose inner diameter meets the outer diameter of the ceramic rotor without exchanging main bodies of hydraulic chucks. Moreover, a split collet made of a ceramic material is preferable because of high wear-resistance of the ceramic materials which does not lower the accuracy of chucking in comparison with metals such as steel.

Machining the end surface 1b of the rotor 1 is effected in the same manner as the prior art as shown in FIG. 2. In order to machine the outer circumference 1a to a predetermined size, the outer diameter is ground to a size of the inner diameter of the split collet 25.

Figure 9:
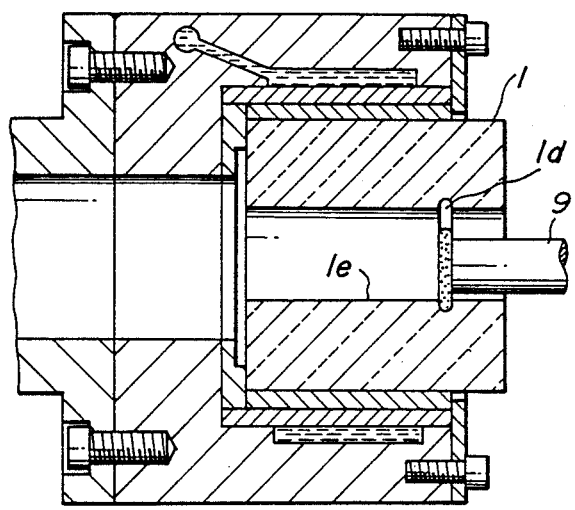

In machining the end surface, after the end surface 1c has been first ground as shown in FIG. 8a, the rotor is turned end for end and chucked in the main body of the hydraulic chuck as shown in FIG. 9. Thereafter, the partially machined end surface 1b having the step is ground to a flat surface to be perpendicular to the outer diameter.

Machining a slit 1d and the inner diameter of the inner circumference 1e may be effected in the same manner as the embodiment shown in FIGS. 5a and 5b.

EXAMPLE

The method of the invention was concretely carried out whose results will be explained hereinafter.

First, silicon nitride ceramic rotors were formed and fired, having 114 mm outer diameters, 39 mm inner diameters, 109 mm lengths, and 2.0 mm and 3.0 mm outer circumferential wall thicknesses. The rotors having 3.0 mm wall thicknesses were machined with outer circumferences. Thereafter, the thicknesses of the walls were measured to fined irregularities within a range 1.1–2.2 mm.

The methods of the prior art and the present invention were compared on time required for machining one rotor. Results are shown in Table 1.

Moreover, the methods of the prior art and the present invention were compared on machined accuracy, dynamic balance of machined rotors and breaking rotating numbers in cold spinning test. The cold spinning test was effected after the dynamic balance at one end of each rotor was adjusted to less than 3 g.cm by balancing the rotor with a specified shaft inserted in its inner circumference. Results are shown in Table 2.

TABLE 1

| Time required for machining one rotor | | | |
|---|---|---|---|
| | Method of prior art (min) | Method according to the invention (min) | |
| | | A | B |
| Adhering to die | 30 | 0 | 0 |
| Machining outer diameter and end surface | 20 | 0 | 20 |
| Chucking | 30 | 5 | 5 |
| Machining slit, inner diameter and both end surfaces | 60 | 30 | 30 |
| Total | 140 | 35 | 55 |

(Note)
A Metal cylinder is used and rotors are as fired.
B Metal cylinder is not used. Outer diameters are machined similar to the prior art.

TABLE 2

| | Accuracy | | |
|---|---|---|---|
| | Method of prior art | Method according to the invention | |
| | | A | B |
| Thickness of outer circumferential wall | 1.2–2.2 mm | 2.0 mm | 1.1–2.2 mm |
| Perpendicularity of end surfaces to inner diameter | less than 10 μm | less than 6 μm | less than 6 μm |
| Concentricity of inner and outer diameters | less than 20 μm | less than 300 μm | less than 8 μm |
| Parallelism of both end surfaces | less than 20 μm | less than 10 μm | less than 10 μm |
| Breaking rotating number | 29,000 rpm | 39,000 rpm | 32,000 rpm |
| Dynamic balance one end | 28 g · cm | 4 g · cm | 18 g · cm |
| Dynamic balance the other | 25 g · cm | 6 g · cm | 17 g · cm |

TABLE 2-continued

| | Accuracy | | |
|---|---|---|---|
| | Method of prior art | Method according to the invention | |
| | | A | B |
| end | | | |

As can be seen from the above explanation, the method of machining cylindrical ceramics according to the invention has the following advantages.

(1) A cylindrical ceramic product such as a rotor is chucked with its entire outer circumference so that it can be strongly supported to decrease deviation of machined surfaces. Therefore, machining can be effected with high accuracy and high efficiency.

(2) Chucking area is wide so that contacting pressure with the ceramic product is low. The cylindrical ceramic product as the rotor having thin walls can be therefore chucked with high accuracy without using any die.

(3) Chucking operation is simple and effected in a short time without requiring centering of the ceramic product and without requiring a skillful operator.

(4) As the ceramic product can be chucked with high accuracy, respective steps for machining end surfaces and inner diameter need not be performed at a time these steps may be effected in separate machines.

(5) The method of the invention is applicable to ceramic rotors as fired. As a result, the performance of rotors are improved.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of machining a ceramic rotor for a pressure wave supercharger, comprising the steps of:

fitting a metal cylinder on an outer circumferential surface of the ceramic rotor, such that the metal cylinder and the ceramic rotor are substantially coaxially aligned;

pressing a first end surface of said ceramic rotor against an inner bottom surface of a hydraulic chuck, such that a second end surface thereof is exposed;

hydraulically grasping said metal cylinder along an outer circumferential surface thereof with clamping means; and machining said exposed second end surface and an inner diameter portion of said ceramic rotor.

2. The method of claim 1, wherein said step of fitting the metal cylinder on an outer circumferential surface of the ceramic rotor further comprises the steps of:

inserting the ceramic rotor into said metal cylinder to expose both ends of the ceramic rotor out of the metal cylinder;

arranging the metal cylinder on a jig in the form of a V-block;

causing points of index dial gauges to abut against outer circumferences of both the ends of the ceramic rotor;

rotating the metal cylinder assembled with the ceramic rotor; and fixing the metal cylinder relative to the ceramic rotor by means of set screws provided in the metal cylinder, so that variations in the indicated values of the index dial gauges become minimum.

3. The method of claim 1, wherein the ceramic rotor is as fired.

4. The method of claim 1, wherein a split collet is inserted into a rotor receiving portion of the hydraulic chuck before the ceramic rotor is pressed against the inner bottom surface of the hydraulic chuck, said split collet corresponding to a difference between an outer diameter of the ceramic rotor and an inner diameter of the rotor receiving portion of the hydraulic chuck.

5. The method of claim 4, wherein the split collet is made of a ceramic material.

* * * * *